(12) United States Patent
Tomoe

(10) Patent No.: US 6,970,680 B1
(45) Date of Patent: Nov. 29, 2005

(54) DEVICE FOR AND METHOD OF DETECTING INTERFERENCE WAVES

(75) Inventor: Naohito Tomoe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/225,245

(22) Filed: Jan. 4, 1999

(30) Foreign Application Priority Data

| Jul. 31, 1998 | (JP) | ................................. 10-218350 |
| Dec. 8, 1998 | (JP) | ................................. 10-349132 |

(51) Int. Cl.$^7$ ............................................. H04B 1/00
(52) U.S. Cl. ................... 455/63.3; 455/452.1
(58) Field of Search ............................ 455/63.1, 67.13, 455/561, 524, 423, 67.11, 450, 424, 63.3, 455/67.15, 452.1

(56) References Cited

U.S. PATENT DOCUMENTS 5,603,093 A * 2/1997 Yoshimi et al. ............... 455/63

FOREIGN PATENT DOCUMENTS

| CA | 1267737 | 4/1990 |
| CA | 2207965 | 12/1997 |
| JP | 62166627 | 7/1987 |
| JP | 62-43613 | 9/1987 |
| JP | 63-55819 | 11/1988 |
| JP | 5-23527 | 4/1993 |

* cited by examiner

Primary Examiner—Quochien B. Vuong
(74) Attorney, Agent, or Firm—Rothwell, Figg, Ernst & Manbeck, PC

(57) ABSTRACT

An interference wave detecting device comprises a transmitter for converting data to be transmitted from a base station into a radio signal of a predetermined transmission frequency, and for transmitting the radio signal to a mobile station by way of a transmitting antenna, a receiving unit for receiving either of a radio signal lying within a certain reception band of frequencies including a predetermined reception frequency from the mobile station and an interference wave signal lying within a certain transmission band of frequencies including the predetermined transmission frequency, and a controlling unit for causing the transmitting unit to stop transmitting the radio signal of the predetermined transmission frequency in order to detect the interference wave signal, and for enabling the receiving unit to receive the interference wave signal only within a period of time during which the transmitting unit stops transmitting the radio signal of the predetermined transmission frequency to the mobile station.

20 Claims, 11 Drawing Sheets

DEVICE FOR AND METHOD OF DETECTING INTERFERENCE WAVES

BACKGROUND OF THE INVENTION

1. Field of the Invention

The present invention relates to a device for and a method of detecting interference waves that can interfere with the reception of radio signals.

2. Description of the Prior Art

Referring next to FIG. 11, there is illustrated a block diagram showing the structure of a prior art interference wave detecting device disposed at a base station, as disclosed in for example Japanese Patent Application Laying Open (KOKAI) No. 62-166627. In the figure, reference numeral 11 denotes a local oscillator for generating a transmission local oscillating signal, 2 denotes a transmitter for modulating data to be transmitted by the base station and for mixing the modulated signal and the transmission local oscillating signal so as to generate a radio signal of a certain transmission frequency, and 3 denotes a transmission/reception branching circuit for furnishing the radio signal from the transmitter 2 to a transmitting/receiving antenna 4 and for furnishing a radio signal applied thereto, which has been transmitted by a mobile station, by way of the transmitting/receiving antenna 4 to a receiver 5. The receiver 5 can mix the radio signal from the transmission/reception branching circuit 3 and a reception local oscillating signal so as to convert the frequency of the radio signal into a certain frequency and demodulate the radio signal to extract received data. A detector 5 can detect the level of the radio signal received by the receiver 5.

In addition, reference numeral 7 denotes a second local oscillator for generating a second reception local oscillating signal, 8 denotes a receiving antenna for receiving a radio signal having a certain frequency different from that of the radio signal from the mobile station received by the receiver 5, 9 denotes a second receiver for mixing the radio signal received by the receive antenna 8 and the second reception local oscillating signal so as to convert the frequency of the radio signal into a certain frequency and demodulate the radio signal to extract received data, 10 denotes a second detector for detecting the level of the radio signal received by the second receiver 9, 11 denotes a switching coupler for selecting either the first received data from the first receiver 5 or the second received data from the second receiver 9 and for adopting the selected data as data received by the base station, and 12 denotes a controller for controlling the switching coupler 11 and so on.

When the base station transmits or sends data to a mobile station, the transmitter 2 modulates a carrier wave with the data to be transmitted and then mixes the modulated signal and the first local oscillating signal from the first local oscillator 1 so as to convert the modulated data to be transmitted into a radio signal of a certain transmission frequency. The transmitter 2 then transmits the radio signal to the mobile station by way of the transmission/reception branching circuit 3 and the transmitting/receiving antenna 4.

On the other hand, when the base station receives a radio signal transmitted by a mobile station, the first receiver 5 mixes the radio signal applied thereto by way of the transmitting/receiving antenna 4 and the first reception local oscillating signal so as to convert the frequency of the received radio signal into a certain frequency and demodulate the radio signal to extract received data. The switching coupler 11 then adopts the extracted data as data received by the base station.

The level of the radio signal received by the first receiver 5 is not always constant. Interference waves having the same frequency as the received radio signal can reduce line quality. It is therefore necessary to change the predetermined reception frequency that the received radio signal has to have when the level of the received radio signal is reduced.

To this end, conventionally, the first detector 6 detects the level of the radio signal received by the first receiver 5, and the controller 12 then monitors the detected level and changes the predetermined reception frequency that the received radio signal has to have if the detected level is lower than a predetermined level, as will be described below. In order to tune from the current reception frequency, i.e. the current upward channel, to another reception frequency, i.e. another channel, at which the level of interference waves can be minimized, the controller 12 measures the level of interference waves having the other reception frequency in advance of changing the current reception frequency.

As previously mentioned, while the first receiver 5 receives a radio signal transmitted by a mobile station, the second receiver 9 receives and converts another radio signal lying having a predetermined frequency which is different from that of the radio signal being received by the first receiver 5 into a signal having another certain frequency. The second detector 10 detects the level of the other radio signal received by the second receiver 9.

The controller 12 then compares the detected level of the other radio signal received by the second receiver 9 with an acceptable level of interference waves. If the detected level of the other radio signal received by the second receiver 9 is lower than accepted, it is assumed that the level of interference waves having the predetermined frequency is low. Thus the controller 12 realizes that the predetermined frequency is an acceptable reception frequency to which the current reception frequency can be changed.

If the detected level of the radio signal received by the first receiver 5 is lower than a predetermined level, the controller 12 changes the current reception frequency that the received radio signal has to the above-mentioned acceptable reception frequency. After that, the controller 12 instructs the switching coupler 11 to select or adopt the second received data from the second receiver 9 as data received by the base station.

On the other hand, if the detected level of the other radio signal received by the second receiver 9 is higher than accepted, it is assumed that the level of interference waves having the predetermined frequency is high. In this case, the controller 12 instructs the second local oscillator 7 to change the frequency of the second reception local oscillating signal so as to change the predetermined reception frequency, i.e. the current reception frequency adopted by the second receiver 9.

After that, the controller 12 repeats the above mentioned processes so as to search for a desired reception frequency at which the level of interference waves is lower than accepted.

While the prior art interference wave detecting device so constructed as mentioned above can tune from the current reception frequency adopted by either the first receiver 5 or the second receiver 9 to another reception frequency at which the level of interference waves is low, it suffers from a disadvantage that it can improve the line quality of the upward line from the mobile station to the base station, but cannot improve the line quality of the downward line from the base station to the mobile station, because it does not have a function of detecting the level of interference waves having the same frequency as the radio signal being transmitted by the transmitter 2, that is, because it cannot independently detect the level of interference waves having the same frequency as the radio signal being transmitted by the transmitter 2 by simply monitoring the level of the radio signal from the transmitter 2.

Although the provision of another receiver intended for receiving the radio signal being transmitted by the transmitter 2 makes it possible to monitor the level of the radio signal received, it does not make it possible to independently detect the level of interference waves having the same frequency as the radio signal being transmitted by the transmitter.

SUMMARY OF THE INVENTION

The present invention is made to overcome the above problem. It is therefore an object of the present invention to provide an interference wave detecting device and an interference wave detecting method for use in a base station, capable of improving the line quality of the downward line from the base station, to which the interference wave detecting device belongs or which employs the interference wave detecting method, to a mobile station on the other end of the line as well as the line quality of the upward line from the mobile station to the base station.

In accordance with one aspect of the present invention, there is provided an interference wave detecting device comprising: a transmitting unit for converting data to be transmitted from a base station into a radio signal of a predetermined transmission frequency, and for transmitting the radio signal to a mobile station; a receiving unit for receiving either of a radio signal lying within a certain reception band of frequencies including a predetermined reception frequency from the mobile station and an interference wave signal lying within a certain transmission band of frequencies including the predetermined transmission frequency; and a controlling unit for causing the transmitting unit to stop transmitting the radio signal of the predetermined transmission frequency in order to detect the interference wave signal, and for enabling the receiving unit to receive the interference wave signal only within a period of time during which the transmitting unit stops transmitting the radio signal of the predetermined transmission frequency to the mobile station.

Preferably, when the receiving unit has received and detected the interference wave signal having a frequency equal to the predetermined transmission frequency, the controlling unit makes a request to change the predetermined transmission frequency to another transmission frequency. In contrast, when the receiving unit has received and detected the interference wave signal lying within the transmission band of frequencies, but having a frequency different from the predetermined transmission frequency, the controlling unit simply furnishes a notify signal indicating the detection of such the interference wave signal.

In accordance with a preferred embodiment of the present invention, only when the transmitting unit is transmitting one or more continuous null time slots of the radio signal, the control unit causes the transmitting unit to stop transmitting the radio signal of the predetermined transmission frequency to the mobile station. Furthermore, only when the receiving unit is receiving one or more continuous null time slots of the radio signal from the mobile station, the control unit can enable the receiving unit to receive the interference wave signal.

Preferably, in order to detect the interference wave signal lying within the transmission band of frequencies, but having a frequency different from the predetermined transmission frequency, the control unit causes the receiving unit to tune from the predetermined reception frequency to a different frequency and then receive the interference wave signal having a frequency different from the predetermined transmission frequency.

In accordance with another preferred embodiment of the present invention, the interference wave detecting device further comprises a plurality of synthesizers. The control unit causes the receiving unit to change the predetermined reception frequency to another transmission frequency by switching among the plurality of synthesizers.

In order to detect an interference wave signal having the same frequency as the radio signal being transmitted thereto by the mobile station, the controlling unit can recognize, as the interference wave signal, the radio signal received by the receiving unit within a period of time during which one or more continuous null time slots of the radio signal are being received. Furthermore, in order to detect an interference wave signal lying within a certain reception band of frequencies, but having a frequency different from that of the radio signal being transmitted thereto by the mobile station, the controlling unit can cause the receiving unit to tune from the predetermined reception frequency to a different frequency within a period of time during which one or more continuous null time slots of the radio signal are being transmitted by the transmitting unit, and recognizes, as the interference wave signal, the radio signal received by the receiving unit within a period of time during which one or more continuous null time slots of the radio signal are being received, after the receiving unit has changed the predetermined reception frequency.

In accordance with another preferred embodiment of the present invention, the controlling unit can cause the transmitting unit to transmit a radio signal including test data, and, when the receiving unit receives the radio signal, compares the test data included in the radio signal transmitted by the transmitting unit with test data included in the received radio signal.

In accordance with another aspect of the present invention, there is provided an interference wave detecting device comprising: a transmitting unit for converting data to be transmitted from a base station into a radio signal of a predetermined transmission frequency, and for transmitting the radio signal to a mobile station; a first receiving antenna for receiving a signal lying within a certain reception band of frequencies including a predetermined reception frequency from the mobile station; a first high-frequency amplifying unit for amplifying the signal received by the first receiving antenna and for allowing only those signal components within the amplified signal to pass which are within a limited range of frequencies; a second receiving antenna for receiving another signal lying within a certain transmission band of frequencies including a predetermined transmission frequency; a second high-frequency amplifying unit for amplifying the other signal received by the second receiving antenna and for allowing only those signal components within the amplified other signal to pass which are within a limited range of frequencies; a first local oscillating unit for generating a first local oscillating signal; a second local oscillating unit for generating a second local oscillating signal of a frequency equal to the difference between the predetermined transmission frequency and the predetermined reception frequency; a mixing unit for mixing the other signal amplified by the second high-frequency amplifying unit and the second local oscillating signal so as to convert the amplified other signal into an output signal of the predetermined reception frequency; a selecting unit for selecting either the output signal from the mixing unit or the signal of the predetermined reception frequency amplified by the first high-frequency amplifying unit, and for furnishing the selected signal; a reception level detecting unit for converting the selected signal from the selecting unit into an intermediate frequency or IF signal using the first local oscillating signal from the first local oscillating unit, and for detecting the level of the selected signal; and a controlling unit for causing the transmitting unit to stop transmitting the radio signal and for causing the selecting unit to select the output signal of the predetermined reception frequency from the mixing unit in order to receive and detect an interference wave signal lying within the transmission band of frequencies.

Preferably, the first local oscillating unit can include two local oscillators for generating two local oscillating signals of different frequencies. The interference wave detecting device further comprises a second selecting unit for selectively furnishing either of the two local oscillating signals as the first local oscillating signal to the reception level detecting unit according to whether or not to detect an interference wave signal of a frequency equal to the predetermined transmission frequency.

In accordance with another aspect of the present invention, there is provided a method of detecting interference waves, comprising the steps of: converting data to be transmitted from a base station into a radio signal of a predetermined transmission frequency, and transmitting the radio signal to a mobile station; receiving a radio signal lying within a certain reception band of frequencies including a predetermined reception frequency from the mobile station; and in order to detect an interference wave signal lying within a certain transmission band of frequencies including the predetermined transmission frequency, stopping the transmission of the radio signal of the predetermined transmission frequency to the mobile station and receiving the interference wave signal.

Preferably, the interference wave detecting method further comprises the steps of, when the interference wave signal having a frequency equal to the predetermined transmission frequency has been detected, making a request to change the predetermined transmission frequency to another transmission frequency, and, when the interference wave signal lying within the transmission band of frequencies, but having a frequency different from the predetermined transmission frequency has been detected, furnishing a notify signal indicating the detection of such the interference wave signal.

In the stopping step, the transmission of the radio signal of the predetermined transmission frequency to the mobile station can be stopped only when one or more continuous null time slots of the radio signal are being transmitted to the mobile station. The interference wave detecting method can further comprise the step of enabling the receiving step of receiving the interference wave signal only when one or more continuous null time slots of the radio signal is being transmitted from the base station.

Preferably, the interference wave detecting method can further comprise the step of, in order to detect an interference wave signal lying within the transmission band of frequencies, but having a frequency different from the predetermined transmission frequency of the radio signal being transmitted to the mobile station, changing the predetermined reception frequency to a different frequency so as to detect the interference wave signal having a frequency which is different from the predetermined transmission frequency.

In accordance with another preferred embodiment of the present invention, the interference wave detecting method further comprises the steps of providing a plurality of synthesizers, and changing the predetermined reception frequency by switching among the plurality of synthesizers.

The interference wave detecting method can further comprise the step of, in order to detect an interference wave signal of a frequency equal to the predetermined reception frequency, recognizing, as the interference wave signal, the radio signal received within a period of time during which one or more continuous null time slots of the radio signal are being received. Furthermore, the interference wave detecting device can comprise the steps of, in order to detect an interference wave signal lying within a certain reception band of frequencies, but having a frequency different from that of the radio signal being transmitted by the mobile station, changing the predetermined reception frequency to a different frequency within a period of time during which one or more continuous null time slots of the radio signal are being transmitted to the mobile station, and recognizing, as the interference wave signal, the radio signal received within a period of time during which one or more continuous null time slots of the radio signal are being received, after the predetermined reception frequency has been changed.

In accordance with another preferred embodiment of the present invention, the interference wave detecting method further comprises the steps of transmitting a radio signal including test data, and, upon receipt of the radio signal, comparing the test data included in the radio signal transmitted in the transmitting step with test data included in the received radio signal.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
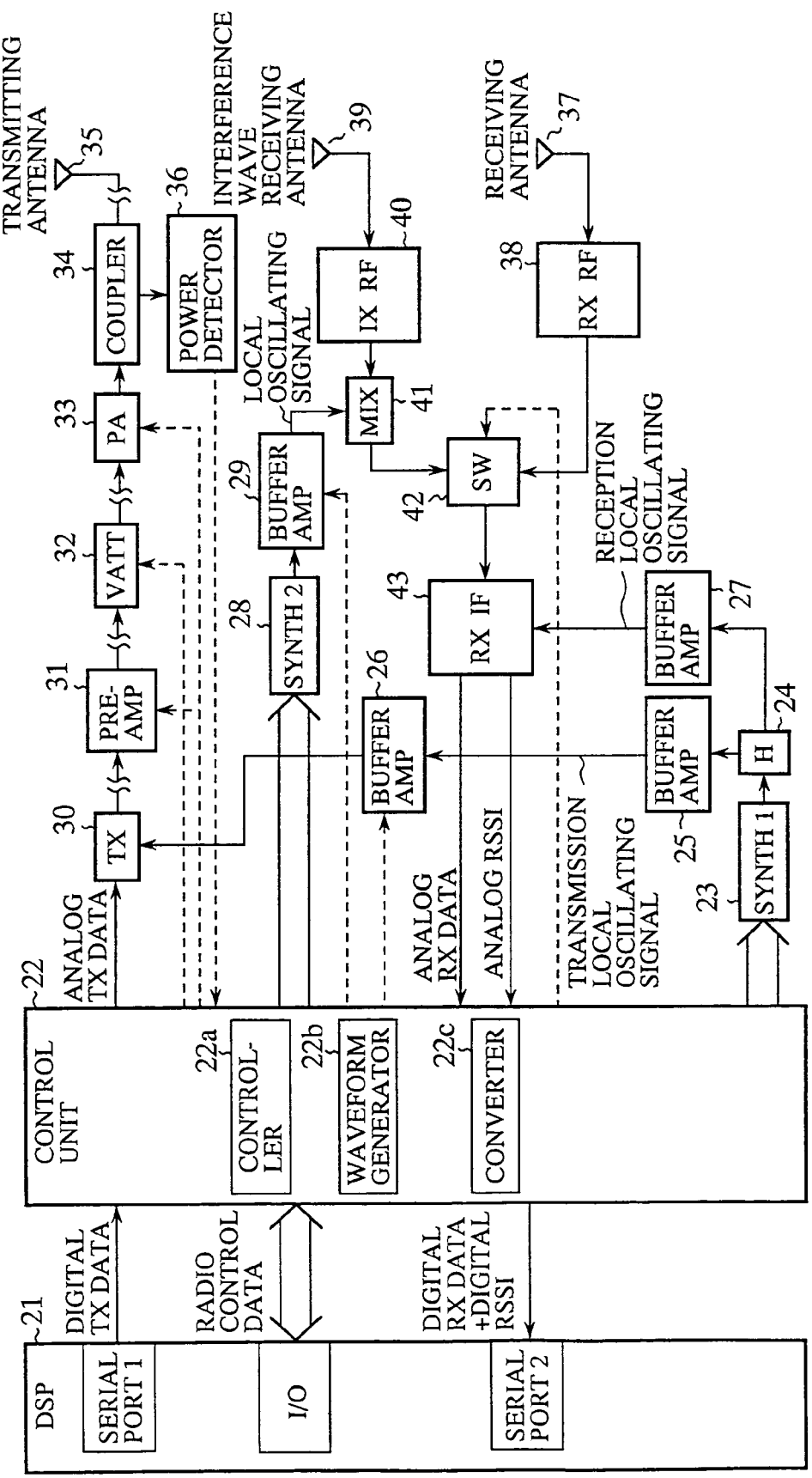
FIG. 1 is a block diagram showing the structure of an interference wave detecting device according to a first embodiment of the present invention.

Referring next to FIG. 1, there is illustrated a block diagram showing the structure of an interference wave detecting device according to a first embodiment of the present invention, which can be disposed at a base station using TDMA. In the figure, reference numeral 21 denotes a digital signal processor or DSP disposed within the base station, and 22 denotes a control unit for converting digital data to be transmitted from the DSP 21 into an equivalent analog signal to be transmitted, for converting a received analog signal and a reception level analog signal, which have been furnished by a receiving IF unit 43, into equivalent received digital data and equivalent reception level digital data, respectively, and for controlling a preamplifier 31, a switch 42, and so on. The control unit 22 is provided with a controller 22a, a waveform generator 22b, and a converter 22c including both an A/D converter and a D/A converter.

Further, reference numeral 23 denotes a first synthesizer for generating a transmission local oscillating signal and a reception local oscillating signal, 24 denotes a distributor, 25 and 26 denote buffer amplifiers for amplifying the transmission local oscillating signal from the first synthesizer, 27 denotes a buffer amplifier for amplifying the reception local oscillating signal from the first synthesizer, 28 denotes a second synthesizer for generating another local oscillating signal having a frequency corresponding to the difference between a predetermined transmission frequency that a radio signal to be transmitted from the base station will have and a predetermined reception frequency that a radio signal received has to have, and 29 denotes a buffer amplifier for amplifying the local oscillating signal generated by the second synthesizer 28.

Reference numeral 30 denotes a transmitter for converting analog data to be transmitted from the control unit 22 into a modulated IF signal, and for mixing the modulated IF signal and the transmission local oscillating signal from the first synthesizer 23 so as to convert the modulated IF signal into a radio signal having the predetermined transmission frequency, 31 denotes a preamplifier for amplifying the radio signal from the transmitter 30, 32 denotes an attenuator for attenuating the radio signal amplified by the preamplifier 31, 33 denotes a power amplifier for amplifying the radio signal from the attenuator 32, 34 denotes a coupler for guiding the radio signal amplified by the power amplifier 33 to a transmitting antenna 35, and 36 denotes a power detector for detecting the level of the radio signal to be transmitted by way of the transmitting antenna 35.

Further, reference numeral 37 denotes a receiving antenna for receiving a radio signal lying within a certain reception band of frequencies including the predetermined reception frequency, 38 denotes a receiving RF unit for high-frequency amplifying the radio signal received by way of the receiving antenna 37 so as to allow only those signal components within the amplified signal to pass which are within a limited range of frequencies, 39 denotes an interference wave receiving antenna for receiving an interference wave signal lying a certain transmission band of frequencies including the predetermined transmission frequency, which can be transmitted through a downward line or channel from the base station to a mobile station on the other end of the line, 40 denotes an interference wave receiving RF unit for high-frequency amplifying the interference wave signal received by way of the interference wave receiving antenna 39 so as to allow only those signal components within the amplified signal to pass which are within a limited range of frequencies, 41 denotes a mixer for mixing the amplified interference wave signal and the local oscillating signal from the second synthesizer 28, which has been amplified by the buffer amplifier 29, so as to change the frequency of the interference wave signal from the predetermined transmission frequency to the predetermined reception frequency, and 42 denotes a switch for connecting either the receiving RF unit 38 or the mixer 41 with a receiving IF unit 43 for mixing either the radio signal from the receiving RF unit 38 or the interference wave signal from the mixer 41 and the reception local oscillating signal from the first synthesizer 23, which has been amplified by the buffer amplifier 27, so as to convert the frequency of either the radio signal or the interference wave signal into an IF signal, and for detecting the level of either the received radio signal from the receiving RF unit 38 or the received interference wave signal from the mixer 41.

Figure 2:
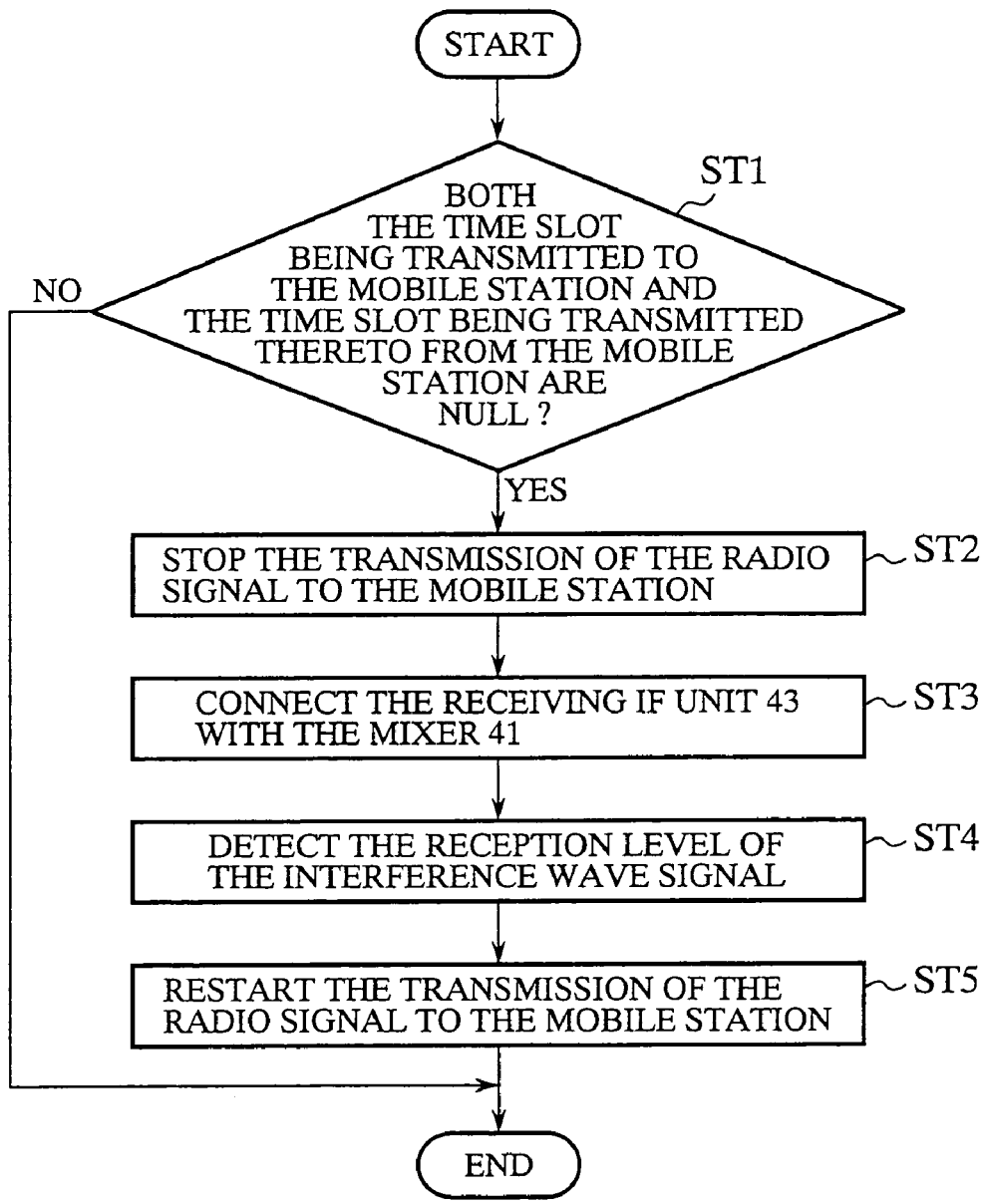
FIG. 2 is a flow diagram showing a method of detecting interference waves that can interfere with a radio signal to be transmitted to a mobile station according to the first embodiment of the present invention.

Referring next to FIG. 2, there is illustrated a flow diagram showing a method of detecting interference waves that can interfere with a radio signal to be transmitted to a mobile station according to the first embodiment of the present invention.

When the base station sends data to a mobile station, the DSP 21 furnishes corresponding digital data (or Digital TX DATA) by way of its first serial port (or Serial Port1). The waveform generator 22b of the control unit 22 then generates a waveform for the digital data from the DSP 21 in order to reduce quantization noise, and the converter 22c of the control unit 22 converts the digital data into an equivalent analog data (or Analog TX DATA).

When the transmitter 30 receives the analog data to be transmitted from the control unit 22, it converts the analog data from the control unit into a modulated IF signal and then mixes the modulated IF signal with the transmission local oscillating signal from the first synthesizer 23 so as to convert the modulated IF signal into a radio signal having the predetermined transmission frequency. For example, when the modulated IF signal has a frequency of 200 MHz and the transmission local oscillating signal has a frequency of 1.7 GHz, the transmitter 30 converts the modulated IF signal into a radio signal having a frequency of 1.9 GHz.

After that, the radio signal sent by the transmitter 30 passes through the preamplifier 31, the attenuator 32, and the power amplifier 33. As a result, the level of the radio signal to be transmitted is adjusted and the radio signal is then transmitted to the mobile station by way of the transmitting antenna 35. The control unit 22 controls or adjusts the attenuation of the radio signal performed by the attenuator 32 according to the detection result from the detector 36 for detecting the level of the radio signal to be transmitted in order to stabilize the level of the radio signal to be transmitted.

On the other hand, when the base station receives a radio signal sent out by a mobile station, the receiving RF unit 38 high-frequency amplifies the radio signal received by the receiving antenna 37 by means of a built-in low-noise amplifier. The receiving RF unit 38 further allows only those signal components within the amplified radio signal to pass which are within a limited range of frequencies by means of a built-in band-pass filter. In this case, the control unit 22 controls the switch 42 so as to connect the receiving RF unit 38 with the receiving IF unit 43. The band-pass filtered radio signal from the receiving RF unit 38 is therefore furnished to the receiving IF unit 43.

When the receiving IF unit 43 receives the radio signal from the receiving RF unit 38, it mixes the radio signal and the reception local oscillating signal so as to convert the radio signal into a signal lying within an IF band of frequencies and hence extract analog received data (or Analog RX DATA). For example, when the received radio signal has a frequency of 1.8 GHz and the reception local oscillating signal has a frequency of 1.7 GHz, the transmitter 30 converts the radio signal into an IF signal having a frequency of 100 MHz.

The receiving IF unit 43 detects the level of the analog received data (or Analog RSSI), i.e. the reception level when generating the analog received data. When the converter 22*c* of the control unit 22 receives both the analog received data and the reception level from the receiving IF unit 43, it converts them into both equivalent digital received data (or Digital RX DATA) and an equivalent digital reception level (or Digital RSSI), respectively. The converter 22*c* of the control unit 22 then furnishes both the digital received data and the digital reception level to a second serial port (or Serial Port2) of the DSP 21. When the DSP 21 receives the digital received data from the control unit 22, it accepts the digital received data as received data of the base station. Further, when the DSP 21 receives the digital reception level from the control unit 22, it manages the line quality of the upward line or channel from the mobile station to the base station based on the digital reception level.

Data transmitting and receiving between the base station and a mobile station on the other end of the line are performed as previously mentioned. If there exists an interference wave having the same frequency as a radio signal having either a certain transmission frequency or a certain reception frequency, which is transmitted from the base station to the mobile station or from the mobile station to the base station, the reception level of the radio signal received by either the mobile station or the base station can be reduced and hence the line quality can be reduced because the radio signal is susceptible to such interference waves.

Therefore, in a case that there exists an interference wave having a frequency which is the same as the predetermined transmission or reception frequency of a radio signal being transmitted between the base station to the mobile station on the other end of the line, the predetermined transmission or reception frequency which the interference wave detecting device is currently using has to be changed as needed. Next, a description will made as to a method of detecting an interference wave signal having a frequency which is the same as the predetermined transmission or reception frequency that the interference wave detecting device employs.

Figure 3:
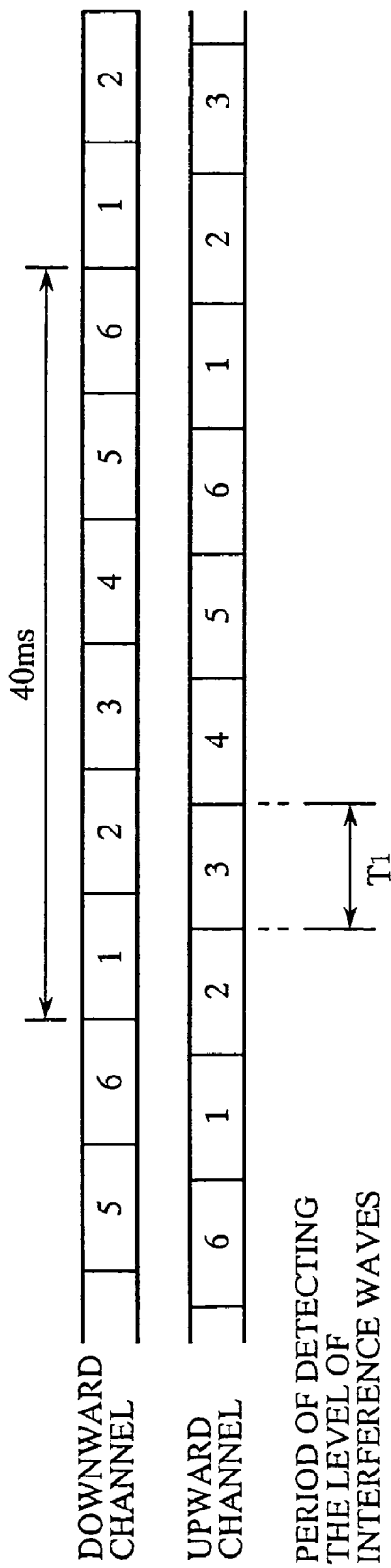
FIG. 3 is a timing chart for explaining a process of detecting an interference wave signal having a frequency equal to a predetermined reception frequency being used for an upward channel, which is carried out by the interference wave detecting device according to the first embodiment of FIG. 1.

First, the description will be directed to a method of detecting an interference wave signal having a frequency which is the same as the predetermined reception frequency currently being used by the upward channel from the mobile station to the base station, i.e. an interference wave signal being transmitted thereto through the same channel as the upward line. In this case, if the radio signal sent out by the mobile station has a null third time slot (see FIG. 3), the interference wave detecting device according to the first embodiment of the present invention can detect the level of the third time slot of the radio signal as the level of the interference wave signal.

In other words, since receiving a null time slot of the radio signal transmitted by the mobile station is the equivalent of receiving no radio signal, that is, no data is transmitted from the mobile station to the base station while receiving a null time slot of the radio signal transmitted by the mobile station, something received within a period of time during which the base station receives a null time slot from the mobile station must be an interference wave signal. Therefore, the interference wave detecting device according to the first embodiment of the present invention can detect the level of any null time slot of the radio signal being received as the level of the interference wave signal.

To be more specific, the control unit 22 can control the switch 42 so as to connect the receiving IF unit 43 with the receiving RF unit 38. As a result, the receiving RF unit 38 furnishes the radio signal amplified and band-pass filtered thereby to the receiving IF unit 43 as the interference wave signal, as in the case that the base station receives a radio signal from the mobile station.

When the receiving IF unit 43 receives the interference wave signal from the receiving RF unit 38, it mixes the interference wave signal and the reception local oscillating signal from the first synthesizer so as to convert the interference wave signal to an IF signal, and then detects the level of the interference wave signal, i.e. the reception level.

When the converter 22*c* of the control unit 22 receives the reception level of the interference wave signal from the receiving IF unit 43, it converts the reception level of the interference wave signal into an equivalent digital signal and then furnishes the digital signal to the second serial port (Serial Port2) of the DSP 21. When the DSP 21 receives the digital signal indicating the reception level of the interference wave signal from the control unit 22, it manages the line quality of the upward line based on the reception level. For example, when the reception level of the interference wave signal is greater than accepted, the DSP 21 determines that the quality of the upward line is reduced and performs a control operation such as causing the first synthesizer 23 to change the frequency of the reception local oscillating signal.

In the case that the interference wave detecting device according to the first embodiment detects the reception level of an interference wave signal having a frequency equal to the predetermined reception frequency used for the upward channel from the mobile station to the base station, the operating status conditions of main components within the device are as follows:

(1) the preamplifier 31 is turned on
(2) the attenuator 32 provides an appropriate attenuation suitable for the detecting operation
(3) the power amplifier 33 is turned on
(4) the buffer amplifier 29 is turned off
(5) the buffer amplifier 26 is turned on
(6) the switch 42 connects the receiving IF unit 43 with the receiving RF unit 38
(7) the first synthesizer 23 selects an appropriate channel suitable for the detecting operation
(8) the second synthesize 28 is locked.

Next, the description will be directed to the operations of detecting an interference wave signal lying within a certain reception band of frequencies, but having a frequency which is different from the predetermined reception frequency currently being used by the upward channel, i.e. an interference wave signal being transmitted thereto through another channel which is different from the upward channel. In this case, there is a need to change the frequency of the reception local oscillating signal from the first synthesizer 23, unlike the case of detecting an interference wave signal having the same frequency as the radio signal being transmitted through the upward line. Because the frequency of the transmission local oscillating signal is varied according to a change in the frequency of the reception local oscillating signal, there is a need to change the frequency of the reception local oscillating signal within a period of time during which the interference wave detecting devices sends out one or more continuous null time slots of the radio signal to the mobile station. This is because if the frequency of the reception local oscillating signal is changed within a period of time during which the time slot being transmitted is not null, data cannot be transmitted from the base station to the mobile station during changing the frequency of the reception local oscillating signal.

Figure 4:
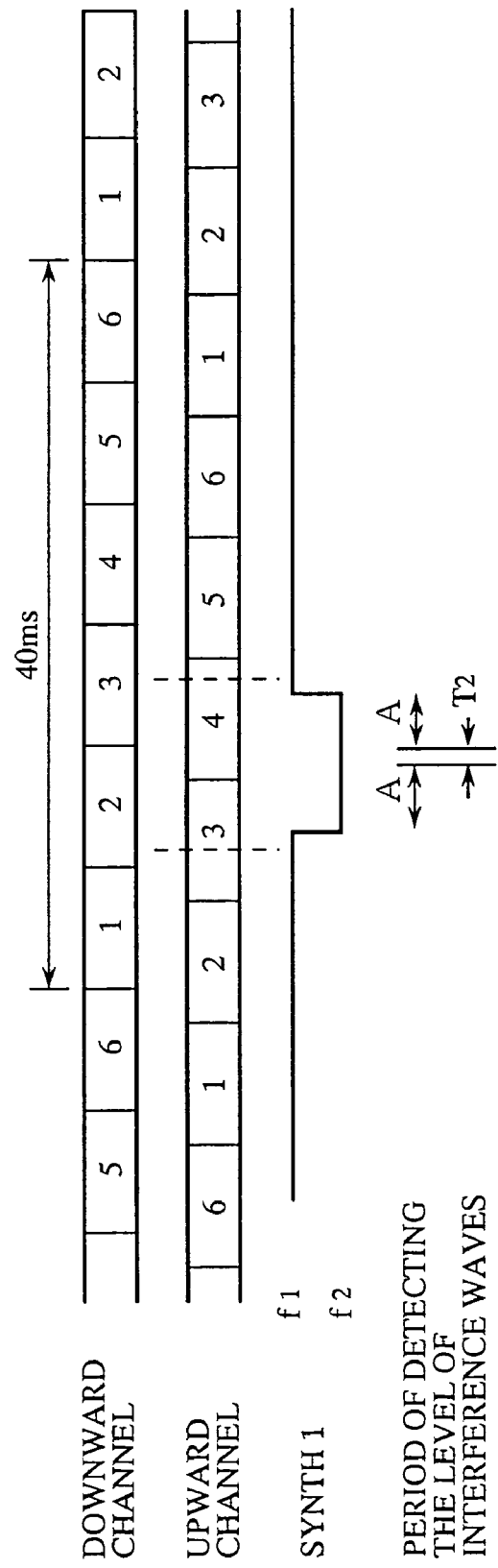
FIG. 4 is a timing chart for explaining a process of detecting an interference wave signal having a frequency different from the predetermined reception frequency being used for the upward channel, which is carried out by the interference wave detecting device according to the first embodiment of FIG. 1.

For example, when the second and third time slots of the radio signal being transmitted from the base station are null, as shown in FIG. 4, the first synthesizer 23 of the interference wave detecting device can change the frequency of the reception local oscillating signal within a period of time during which the null second time slot is being transmitted. In this case, the frequency of the current channel being used by the synthesizer 23 is f1 and the current channel is changed to another channel having a frequency of f2 when detecting the level of the interference wave signal.

When switching the current channel of the synthesizer 23 to the other channel, it takes enough time for the output of the first synthesizer 23 to become stable. Therefore, in the example of FIG. 4, the interference wave detecting device is adapted to detect the reception level of the interference wave signal within a measuring period of time T2 after the expiration of a predetermined period A after the channel switching has been carried out. The other procedure of detecting the reception level of the interference wave signal is the same as in the case of detecting an interference wave signal having the same frequency as a radio signal currently being transmitted through the upward channel from the mobile station to the base station, and therefore the description of the other detecting procedure will be hereinafter omitted.

In the case that the interference wave detecting device according to the first embodiment detects the reception level of an interference wave signal lying within a certain reception band of frequencies, but having a frequency which is different from the predetermined reception frequency currently being used by the upward channel, the operating status conditions of main components within the device are as follows:

(1) the preamplifier 31 is turned on
(2) the attenuator 32 provides an appropriate attenuation suitable for the detecting operation
(3) the power amplifier 33 is turned on
(4) the buffer amplifier 29 is turned off
(5) the buffer amplifier 26 is turned on
(6) the switch 42 connects the receiving IF unit 43 with the receiving RF unit 38
(7) the first synthesizer 23 switches from the channel f1 to the channel f2
(8) the second synthesize 28 is locked.

In the example of FIG. 4, in order to prevent the data transmission of the fourth time slot of the radio signal being transmitted from the base station from being affected by the detecting operation, it is necessary to change the frequency of the reception local oscillating signal back to its previous value so that the output of the first synthesizer 23 becomes stable until the head of the fourth time slot is transmitted.

Next, the description will be directed to detecting an interference wave signal having the same frequency as a radio signal being transmitted through the downward line or channel from the base station to a mobile station on the other end of the line, i.e. an interference wave signal being transmitted thereto through the same channel as the radio signal being transmitted to the mobile station. In this case, there is a need to temporarily stop the transmission of the radio signal by way of the transmitting antenna 35, unlike the case of detecting an interference wave signal having the same frequency as a radio signal being transmitted thereto through the upward channel. This is because the interference wave detecting device cannot the reception level of an interference wave signal having the same frequency as the radio signal being transmitted to the mobile station independently because the interference wave receiving antenna 39 receives the radio signal being transmitted to the mobile station by way of the transmitting antenna 35 as well as the interference wave signal.

Figure 5:
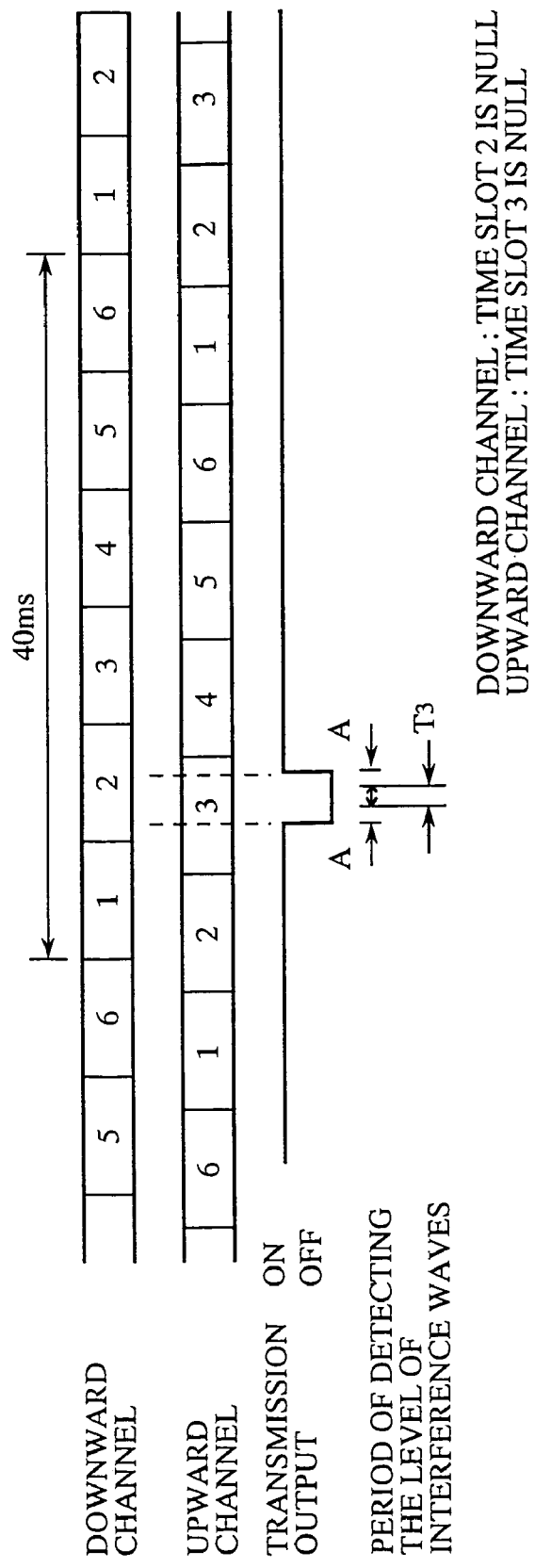
FIG. 5 is a timing chart for explaining a process of detecting an interference wave signal having a frequency equal to a predetermined transmission frequency being used for a downward channel, which is carried out by the interference wave detecting device according to the first embodiment of FIG. 1.

When both the time slot being transmitted of the radio signal destined for the mobile station and the time slot being received of the radio signal from the mobile station are null (in an example of FIG. 5, while transmitting the second time slot through the downward line and receiving the third time slot through the upward line), the controller 22c of the control unit 22 controls the preamplifier 31, the attenuator 32, the power amplifier 33, and the buffer amplifier 26, as will be described below, so as to temporarily stop the transmission of the radio signal by way of the transmitting antenna 35, in steps ST1 and ST2 of FIG. 2. After the expiration of the response time A of the analog circuitry after the transmission output is switched from its ON state to its OFF state, the receiving IF unit 43 detects the reception level of the interference wave signal within a time period of T3.

When the controller 22c of the control unit 22 temporarily stops the transmission of the radio signal by way of the transmitting antenna 35 by controlling the preamplifier 31 and so on, it then, in step ST3, controls the switch 42 so as to connect the receiving IF unit 43 with the mixer 41. The received interference wave signal, which has been band-pass filtered and amplified by the interference wave receiving RF unit 40, enters the mixer 41 and then reaches the receiving IF unit 43. The mixer 41 mixes the received interference wave signal furnished by the interference wave receiving RF unit 40 and the local oscillating signal from the second synthesizer 28, the local oscillating signal having a frequency corresponding to the difference between the predetermined transmission frequency and the predetermined reception frequency, so as to change the frequency of the interference wave signal from the predetermined transmission frequency to the predetermined reception frequency. For example, when the receiving interference wave signal has a frequency of 1.9 GHz and the local oscillating signal form the second synthesizer 28 has a frequency of 10 MHz, which corresponds to the difference between the predetermined transmission frequency and the predetermined reception frequency, the output of the mixer 41 has a frequency of 1.8 GHz, which is the same as the reception frequency currently being used by the upward channel.

When the receiving IF unit 42 then receives the interference wave signal from the mixer 41, it mixes the interference wave signal and the reception local oscillating signal from the first synthesizer 23 so as to convert the received interference wave signal into an IF signal and then detect the reception level of the interference wave signal, in step ST4.

When the controller 22c of the control unit 22 receives the reception level of the interference wave signal detected by the receiving IF unit 43, it analog-to-digital converts the reception level of the interference wave signal and then furnishes the digital signal indicating the reception level to the second serial port (Serial Port2) of the DSP 21.

When the DSP 21 receives the digital signal indicating the reception level of the interference wave signal from the control unit 22, it manages the line quality of the downward channel based on the reception level. For example, when the reception level of the interference wave signal is greater than accepted, the DSP 21 determines that the quality of the downward channel is reduced and performs a control operation such as causing the first synthesizer 23 to change the frequency of the transmission local oscillating signal.

In the case that the interference wave detecting device according to the first embodiment detects the reception level of an interference wave signal having a frequency equal to the predetermined transmission frequency currently being used by the downward channel, the operating status conditions of main components are as follows:

(1) the preamplifier 31 is turned off
(2) the attenuator 32 provides a maximum of attenuation
(3) the power amplifier 33 is turned off
(4) the buffer amplifier 29 is turned on
(5) the buffer amplifier 26 is turned off
(6) the switch 42 connects the receiving IF unit 43 with the mixer 41
(7) the first synthesizer 23 selects an appropriate channel suitable for the detecting operation
(8) the second synthesize 28 is locked.

In order to prevent the data transmission of the third time slot of the radio signal being transmitted from the base station from being affected by the detecting operation, it is necessary to, in step ST5, restart transmitting the radio signal to the mobile station until the head of the third time slot is transmitted.

Next, the description will be directed to detecting an interference wave signal lying within a certain transmission band of frequencies, but having a frequency different from the predetermined transmission frequency currently being used by the downward channel, i.e. an interference wave signal able to be transmitted to the mobile station through another channel different from the current downward channel. In this case, there is a need to change the frequency of the reception local oscillating signal from the first synthesizer 23, unlike the case of detecting an interference wave signal having a frequency equal to the predetermined transmission frequency currently being used by the downward channel. Because the transmission local oscillating signal is varied according to a change in the frequency of the reception local oscillating signal, there is a need to change the frequency of the reception local oscillating signal within a period of time during which one or more continuous null time slots of the radio signal are being transmitted to the mobile station. This is because if the frequency of the reception local oscillating signal is changed and hence the frequency of the transmission local oscillating signal is changed within a period of time during which the time slot being transmitted is not null, the corresponding data cannot be transmitted from the base station to the mobile station during changing the frequency of the reception local oscillating signal.

Figure 6:
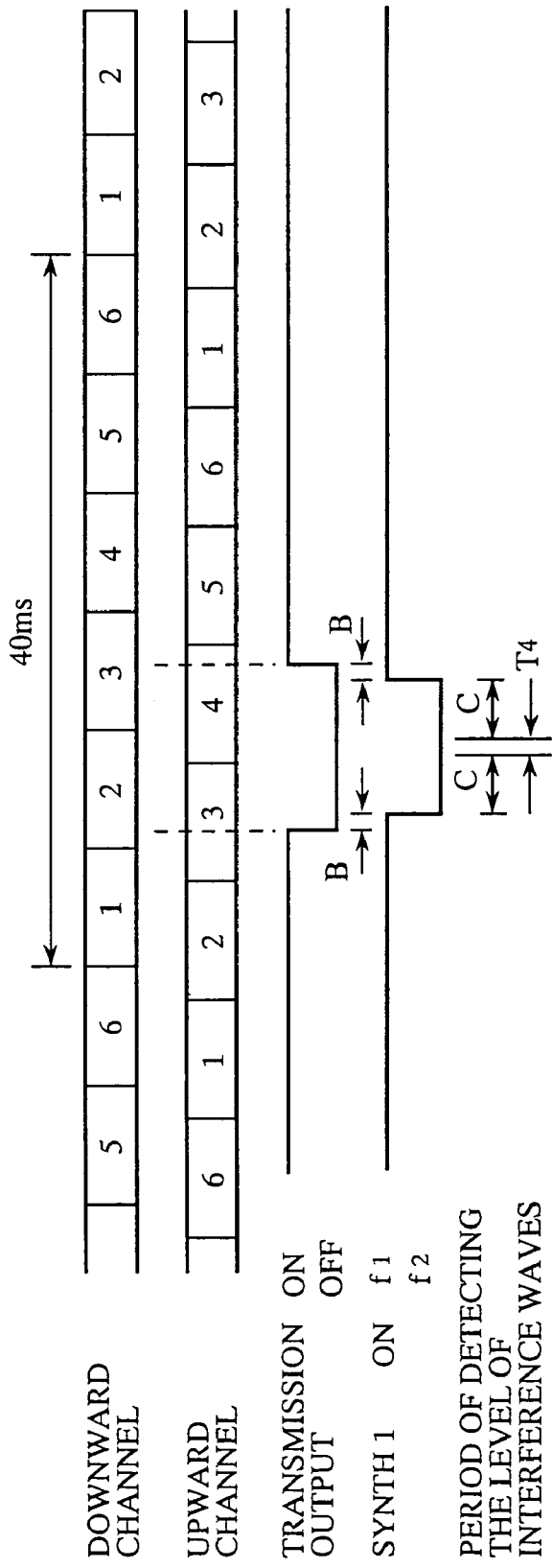
FIG. 6 is a timing chart for explaining a process of detecting an interference wave signal having a frequency different from the predetermined transmission frequency being used for the downward channel, which is carried out by the interference wave detecting device according to the first embodiment of FIG. 1.

For example, when the second and third time slots of the radio signal being transmitted from the base station are null, as shown in FIG. 6, the first synthesizer 23 of the interference wave detecting device can change the frequency of the reception local oscillating signal within a period of time during which the second time slot is being transmitted. After the expiration of the response time B after the transmission output is switched from its ON state to its OFF state, the first synthesizer 23 can switch from the current channel to another channel. After the synthesizer 23 switches from the current channel to another channel, it takes enough time for the output of the first synthesizer 23 to become stable. Therefore, in the example of FIG. 6, the interference wave detecting device is adapted to detect the reception level of the interference wave signal within a measuring period of time T4 after the expiration of a predetermined period C after the channel switching has been carried out. The other procedure of detecting the reception level of the interference wave signal is the same as in the case of detecting an interference wave signal of the same frequency as the radio signal being transmitted to the mobile station through the downward channel, and therefore the description of the other detecting procedure will be hereinafter omitted.

In the case that the interference wave detecting device according to the first embodiment detects the reception level of an interference wave signal lying within a certain transmission band of frequencies, but having a frequency different from the predetermined transmission frequency currently being used by the downward channel, the operating status conditions of main components are as follows:

(1) the preamplifier 31 is turned off
(2) the attenuator 32 provides a maximum of attenuation
(3) the power amplifier 33 is turned off
(4) the buffer amplifier 29 is turned on
(5) the buffer amplifier 26 is turned off
(6) the switch 42 connects the receiving IF unit 43 with the mixer 41
(7) the first synthesizer 23 switches from the current channel f1 to another channel f2
(8) the second synthesize 28 is locked.

In order to prevent the data transmission of the fourth time slot in the radio signal being transmitted from the base station from being affected by the detecting operation, it is necessary to change the frequency of the reception local oscillating signal back to its previous value so that the output of the first synthesizer 23 becomes stable until the head of the fourth time slot is transmitted.

When the control unit 22 receives the nonzero reception level of a received interference wave signal having a frequency equal to the predetermined transmission frequency from the receiving IF unit 43, it can make a request to change the predetermined transmission frequency to another transmission frequency to the DSP 21. Similarly, when the control unit 22 receives the nonzero reception level of a received interference wave signal having a frequency equal to the predetermined reception frequency from the receiving IF unit 43, it can make a request to tune from the predetermined reception frequency to another reception frequency to the DSP 21. In contrast, when the control unit 22 receives the nonzero reception level of either a received interference wave signal lying within a certain transmission band of frequencies, but having a frequency different from the predetermined transmission frequency, or a received interference wave signal lying within a certain reception band of frequencies, but having a frequency different from the predetermined reception frequency, from the receiving IF unit 43, it can furnish a notify signal indicating that such the interference wave signal has been detected to the DSP so as to make a request to disable the use of the same frequency as the detected interference wave signal.

As can be seen from the above description, in accordance with the first embodiment of the present invention, there is provided an interference wave detecting method and a device using the method, capable of stopping a transmission process of transmitting a radio signal being transmitted to a mobile station so as to receive and detect an interference wave signal lying within a certain transmission band of frequencies, which can interfere with reception of the radio signal being transmitted to the mobile station, and detect the level of the interference wave signal. Accordingly, the first embodiment of the present invention offers an advantage of being able to detect interference waves that can interfere with reception of a radio signal to be transmitted to a mobile station without having to scale up the circuitry, thereby improving the line quality of the downward channel from the base station to the mobile station as well as the line quality of the upward channel from the mobile station to the base station.

Second Embodiment

Figure 7:
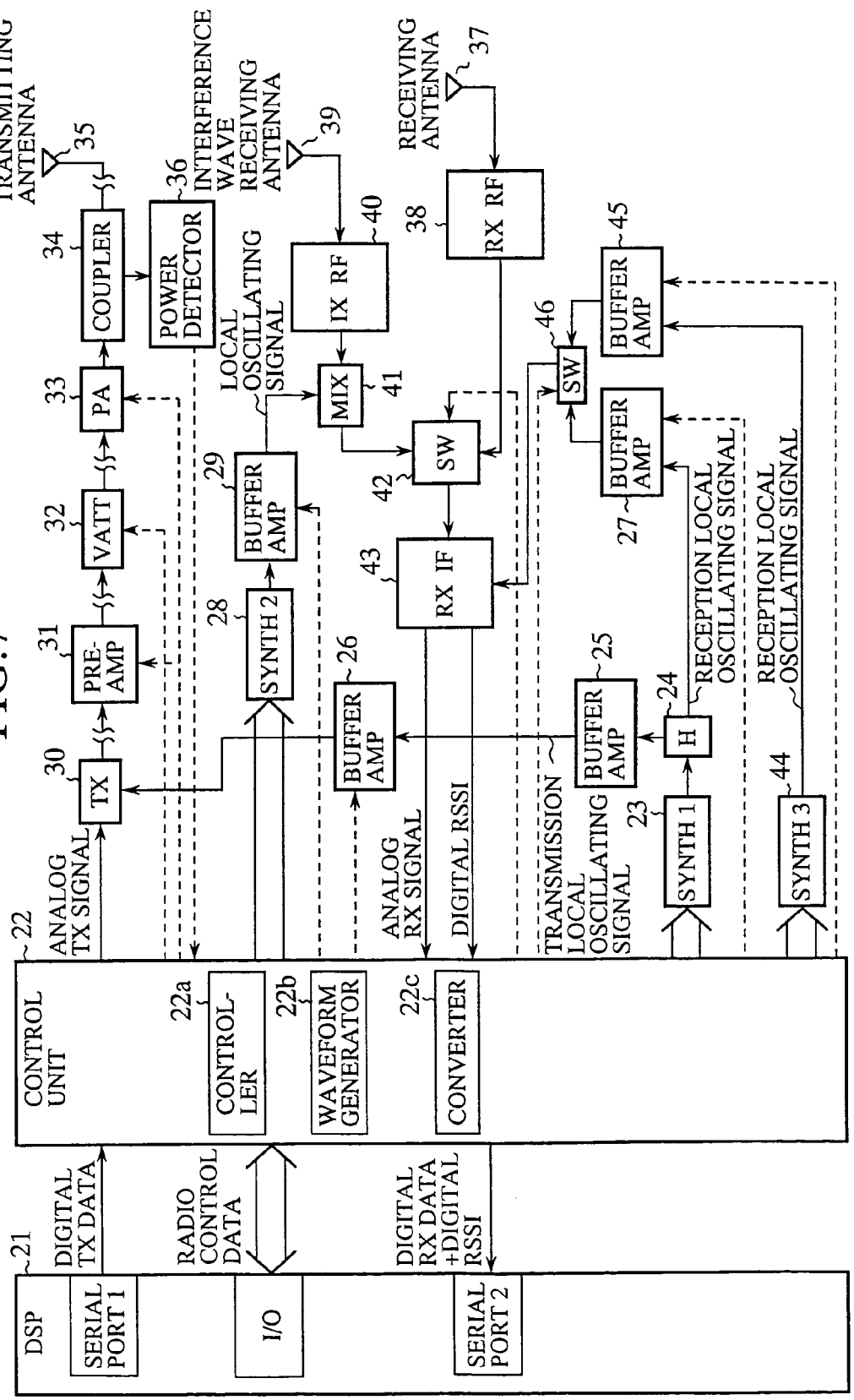
FIG. 7 is a block diagram showing the structure of an interference wave detecting device according to a second embodiment of the present invention.

Referring next to FIG. 7, there is illustrated a block diagram showing the structure of an interference wave detecting device according to a second embodiment of the present invention. In the figure, the same reference numerals as shown in FIG. 1 designate the same elements as of the first embodiment mentioned above, and therefore the description of those elements will be hereinafter omitted. Reference numeral 44 denotes a third synthesizer for generating a second receiving 1st local oscillating signal having a frequency f2 which is different from the frequency f1 of a first receiving 1st local oscillating signal generated by a first synthesizer 23, 45 denotes a buffer amplifier for amplifying the second receiving 1st local oscillating signal from the third synthesizer 44, and 46 denotes a switch for connecting either a buffer amplifier 27 or the buffer amplifier 45 with a receiving IF unit 43.

When detecting an interference wave signal either having a frequency different from a predetermined reception frequency currently being used by the upward channel from a mobile station on the other end of the connection to the base station (i.e. an interference wave signal being transmitted thereto through another channel) or having a frequency different from a predetermined transmission frequency currently being used by the downward channel (i.e. an interference wave signal being transmitted to the mobile station through another channel), the interference wave detecting device according to the above-mentioned first embodiment causes the first synthesizer 23 to switch from the current channel thereof to another channel thereof, as previously explained. In this case, the interference wave detecting device needs to wait for detecting the level of the interference wave signal until the output of the first synthesizer 23 will become stable after it has switched from the current channel to another channel.

In contrast, the interference wave detecting device according to the second embodiment of the present invention can detect the level of the interference wave signal using the third synthesizer 44 disposed separately from the first synthesizer 23, by enabling the controller 22c of the control unit 22 to control the switch 46 so as to switch the connection for the receiving IF unit 43 from the buffer amplifier 27 to the buffer amplifier 45, thereby eliminating the need for the channel switching done by the first synthesizer 23 and hence reducing the time required for detecting the level of the interference wave signal. After the receiving IF unit 43 has detected the level of the interference wave signal, the controller 22c of the control unit 22 controls the switch 46 so as to switch back the connection for the receiving IF unit 43 from the buffer amplifier 45 to the buffer amplifier 27.

Figure 8:
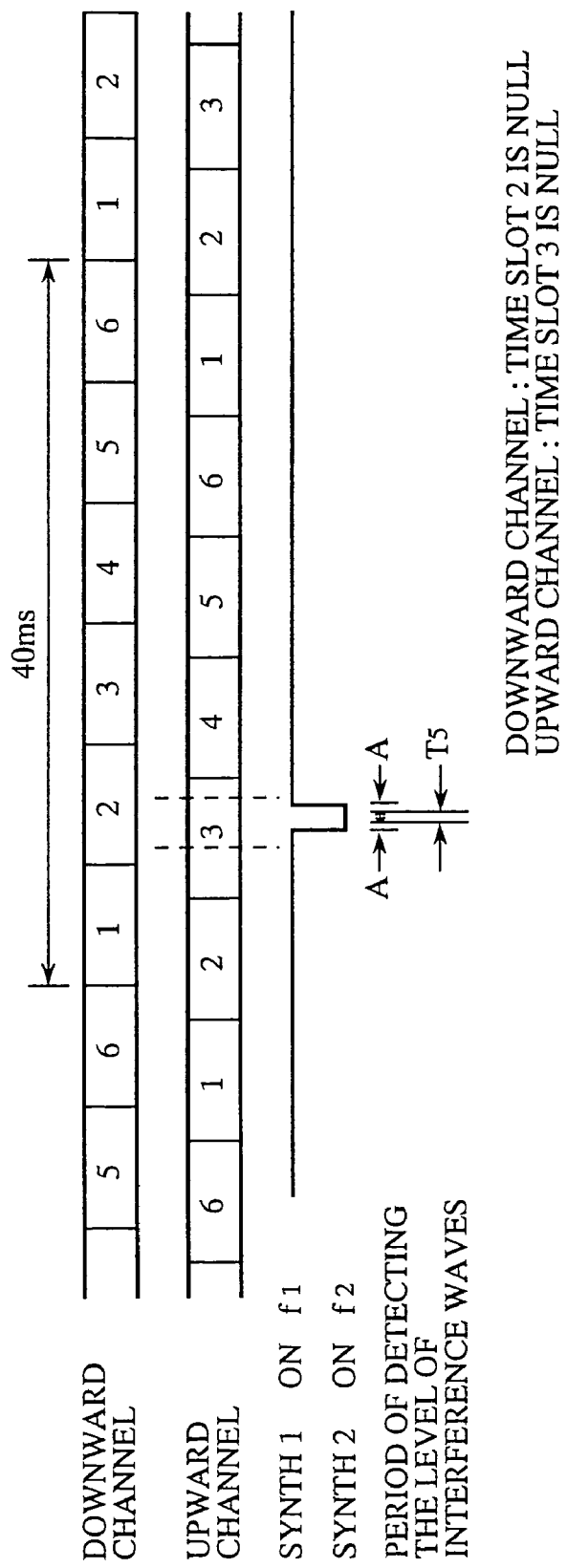
FIG. 8 is a timing chart for explaining a process of detecting an interference wave signal having a frequency different from the predetermined reception frequency being used for the upward channel, which is carried out by the interference wave detecting device according to the second embodiment of FIG. 7.

In the case of detecting the level of interference waves lying within a certain transmission band of frequencies, but having a frequency different from a predetermined reception frequency currently being used by the upward channel (i.e. an interference wave signal being transmitted thereto through another channel), the receiving IF unit 43 performs the detecting operation within a period of time T5 during which null time slot 2 is being transmitted through the downward channel and null time slot 3 is being received through the upward channel, for example, as shown in FIG. 8.

Figure 9:
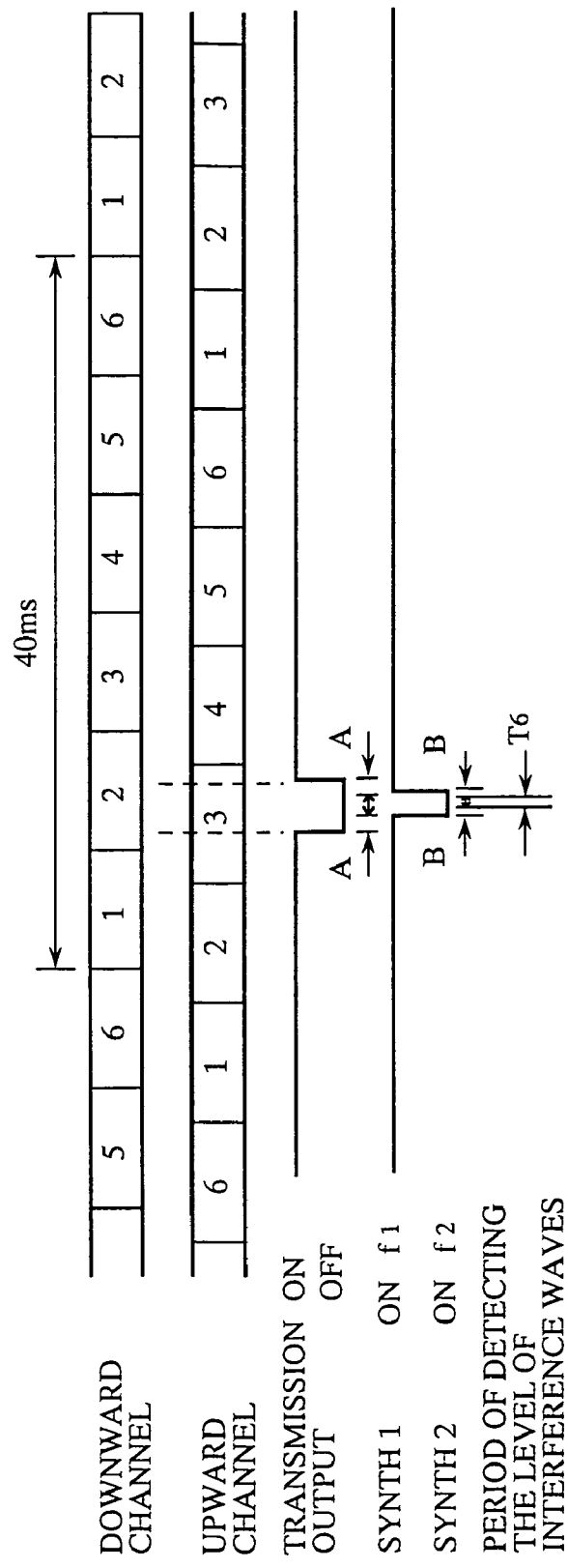
FIG. 9 is a timing chart for explaining a process of detecting an interference wave signal having a frequency different from the predetermined transmission frequency being used for the downward channel, which is carried out by the interference wave detecting device according to the second embodiment of FIG. 7.

In the case of detecting the level of interference waves lying within a certain transmission band of frequencies, but having a frequency different from a predetermined transmission frequency currently being used by the downward channel (i.e. an interference wave signal being transmitted to the mobile station through another channel), the receiving IF unit 43 performs the detecting operation within a period of time T6 during which null time slot 2 is being transmitted through the downward channel and null time slot 3 is being received through the upward channel, for example, as shown in FIG. 9.

Third Embodiment

In either of the first and second embodiments mentioned above of the present invention, the interference wave detecting device is so constructed as to detect the reception level of an interference wave signal received. In contrast, in accordance with a third embodiment of the present invention, there is provided an interference wave detecting device capable of transmitting a radio signal including test data by way of a transmitting antenna 35, receiving the radio signal including the test data by way of an interference wave receiving antenna 39, and comparing the test data included in the radio signal sent out with test data extracted from the received radio signal by mean of a DSP 21.

In other words, after the interference wave detecting device of the third embodiment furnishes and then receives a radio signal including arbitrary test data, it can make sure the correct transmission and reception functioning of the base station if it recognizes the agreement between the test data transmitted and test data extracted from the received radio signal.

For example, within a period of time during which time slots 5 and 6 are transmitted to the mobile station through the downward channel, the DSP 21 furnishes arbitrary data A with all bits set to zero, for example, for synchronization between a radio signal to be transmitted and a radio signal to be received, and then furnishes arbitrary test data B that complies with an authorized data format defined by the system (refer to the procedure of furnishing and transmitting data as disclosed in First Embodiment mentioned above). After the transmission of the test data B, the DSP further furnishes arbitrary data C with all bits set to zero, for example, for synchronization between a radio signal to be transmitted and a radio signal to be received.

Figure 10:
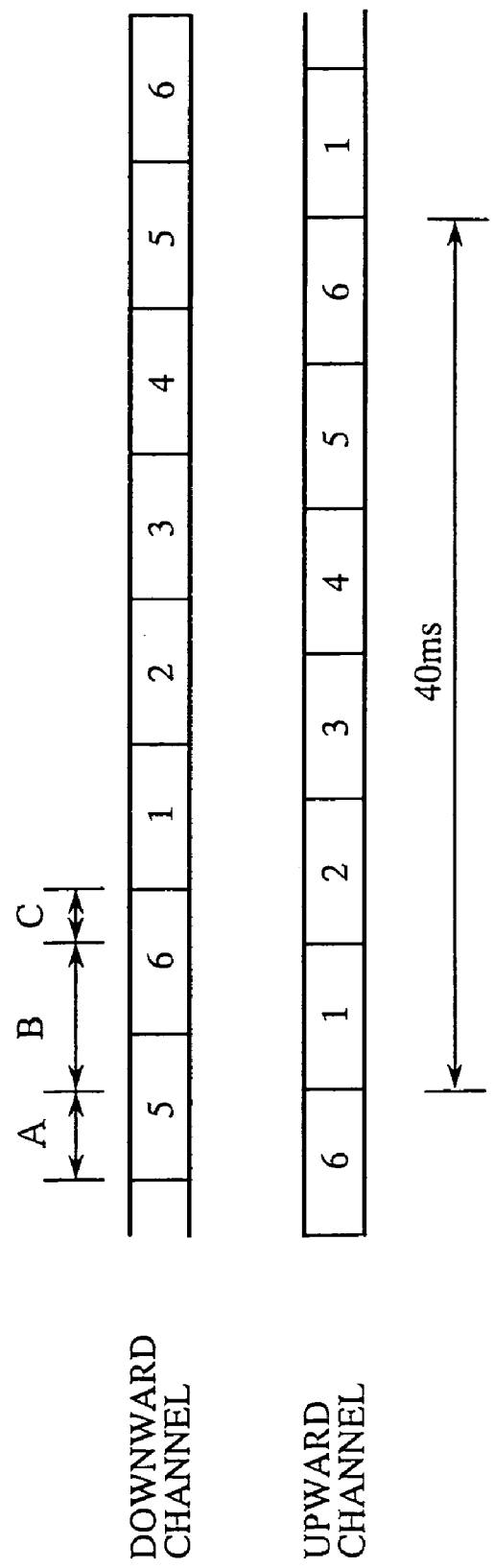
FIG. 10 is a timing chart for explaining a process of making sure the correct transmission and reception functioning, which is carried out by an interference wave detecting device according to a third embodiment of the present invention.
Figure 11:
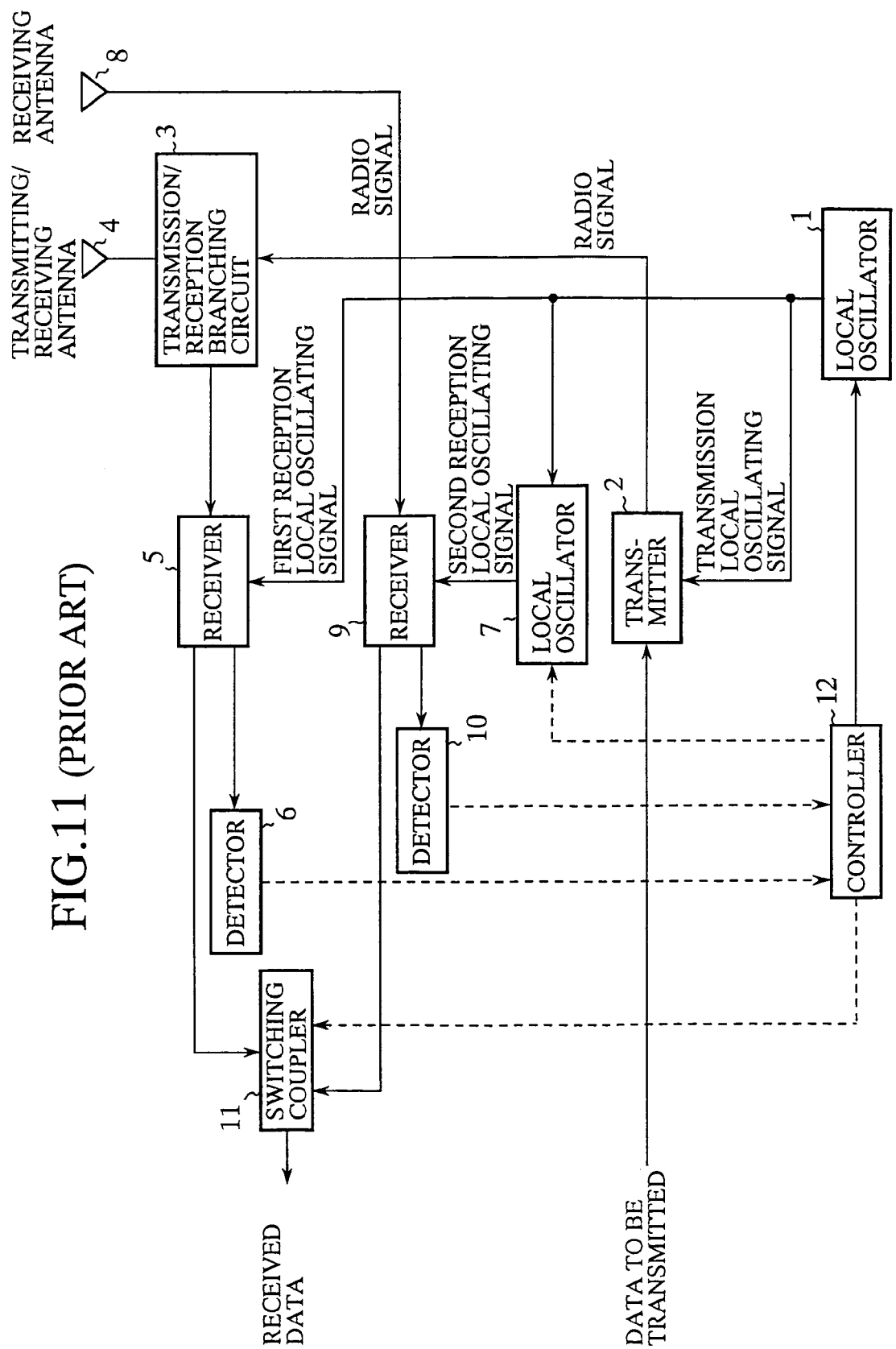
FIG. 11 is a block diagram showing the structure of a prior art interference wave detecting device.

After the transmitter 30 has performed transmission operations on the test data B, it transmits the test data B as a high-frequency modulated signal by way of the transmitting antenna 35. When the interference wave detecting device receives the high-frequency modulated signal by way of the interference wave antenna 39 and so on, it carries out downward interference wave receiving operations on the received signal, as described in First Embodiment, and then furnishes digital received data to the DSP 21. The DSP 21 then demodulates the digital received data of the time slot 1 received through the upward channel, as shown in FIG. 10, so as to extract data from the time slot 1. The DSP 21 then can make sure the correct transmission and reception functioning of the base station and provide information indicating the correct transmission and reception functioning of the base station if it recognizes the agreement between the test data B transmitted and the data extracted from the received radio signal. If not, the DSP 21 can make sure that the transmission and reception functioning of the base station is incorrect and provide information indicating the incorrect transmission and reception functioning of the base station.

Many widely different embodiments of the present invention may be constructed without departing from the spirit and scope of the present invention. It should be understood that the present invention is not limited to the specific embodiments described in the specification, except as defined in the appended claims.

What is claimed is:

1. An interference wave detecting device incorporated into a base station of a wireless communication system, comprising:

transmitting means for converting data to be transmitted from said base station into a radio signal of a predetermined transmission frequency, and for transmitting said radio signal to a mobile station;

receiving means for receiving either of a radio signal lying within a certain reception band of frequencies including a predetermined reception frequency from said mobile station and an interference wave signal lying within a certain transmission band of frequencies including said predetermined transmission frequency, said predetermined reception frequency being different from said predetermined transmission frequency; and controlling means for causing said transmitting means to stop transmitting said radio signal of said predetermined transmission frequency in order to detect said interference wave signal, and for enabling said receiving means to receive said interference wave signal only within a period of time during which said transmitting means stops transmitting said radio signal of said predetermined transmission frequency to said mobile station.

2. The interference wave detecting device according to claim 1, wherein when said receiving means has received and detected said interference wave signal having a frequency equal to said predetermined transmission frequency, said controlling means makes a request to change said predetermined transmission frequency to another transmission frequency, and wherein when said receiving means has received and detected said interference wave signal lying within said transmission band of frequencies, but having a frequency different from said predetermined transmission frequency, said controlling means furnishes a notify signal indicating the detection of the interference wave signal.

3. The interference wave detecting device according to claim 1, wherein only when said transmitting means is transmitting one or more continuous null time slots of said radio signal, said control means causes said transmitting means to stop transmitting said radio signal of said predetermined transmission frequency to said mobile station.

4. The interference wave detecting device according to claim 3, wherein only when said receiving means is receiving one or more continuous null time slots of said radio signal from said mobile station, said control means enables said receiving means to receive said interference wave signal.

5. The interference wave detecting device according to claim 3, wherein in order to detect said interference wave signal lying within said transmission band of frequencies, but having a frequency different from said predetermined transmission frequency, said control means causes said receiving means to tune from said predetermined reception frequency to a different reception frequency and then receive said interference wave signal having a frequency different from said predetermined transmission frequency.

6. The interference wave detecting device according to claim 5, further comprising a plurality of synthesizers, wherein said control means causes said receiving means to change said predetermined reception frequency to another transmission frequency by switching among said plurality of synthesizers.

7. The interference wave detecting device according to claim 1, wherein in order to detect an interference wave signal having the same frequency as said radio signal being transmitted thereto by said mobile station, said controlling means recognizes, as said interference wave signal, said radio signal received by said receiving means within a period of time during which one or more continuous null time slots of said radio signal are being received.

8. The interference wave detecting device according to claim 1, wherein in order to detect an interference wave signal lying within a certain reception band of frequencies, but having a frequency different from that of said radio signal being transmitted thereto by said mobile station, said controlling means causes said receiving means to tune from said predetermined reception frequency to a different reception frequency within a period of time during which one or more continuous null time slots of said radio signal are being transmitted by said transmitting means, and recognizes, as said interference wave signal, said radio signal received by said receiving means within a period of time during which one or more continuous null time slots of said radio signal are being received, after said receiving means has changed said predetermined reception frequency.

9. The interference wave detecting device according to claim 1, wherein said controlling means causes said transmitting means to transmit a radio signal including test data, and, when said receiving means receives said radio signal, compares said test data included in said radio signal transmitted by said transmitting means with test data included in said received radio signal.

10. An interference wave detecting device comprising:
transmitting means for converting data to be transmitted from a base station into a radio signal of a predetermined transmission frequency, and for transmitting said radio signal to a mobile station;
a first receiving antenna for receiving a signal lying within a certain reception band of frequencies including a predetermined reception frequency from said mobile station;
first high-frequency amplifying means for amplifying said signal received by said first receiving antenna and for allowing only those signal components within the amplified signal to pass which are within a limited range of frequencies;
a second receiving antenna for receiving another signal lying within a certain transmission band of frequencies including a predetermined transmission frequency; second high-frequency amplifying means for amplifying said other signal received by said second receiving antenna and for allowing only those signal components within the amplified other signal to pass which are within a limited range of frequencies;
first local oscillating means for generating a first local oscillating signal;
second local oscillating means for generating a second local oscillating signal of a frequency equal to the difference between said predetermined transmission frequency and said predetermined reception frequency;
mixing means for mixing said other signal amplified by said second high-frequency amplifying means and said second local oscillating signal so as to convert said amplified other signal into an output signal of said predetermined reception frequency;
selecting means for selecting either said output signal from said mixing means or said signal of said predetermined reception frequency amplified by said first high-frequency amplifying means, and for furnishing the selected signal;
reception level detecting means for converting said selected signal from said selecting means into an intermediate frequency or IF signal using said first local oscillating signal from said first local oscillating means, and for detecting the level of said selected signal; and
controlling means for causing said transmitting means to stop transmitting said radio signal and for causing said selecting means to select said output signal of said predetermined reception frequency from said mixing means in order to receive and detect an interference wave signal lying within said transmission band of frequencies.

11. The interference wave detecting device according to claim 10, wherein said first local oscillating means includes two local oscillators for generating two local oscillating signals of different frequencies, and wherein said interference wave detecting device further comprises second selecting means for selectively furnishing either of said two local oscillating signals as said first local oscillating signal to said reception level detecting means according to whether or not to detect an interference wave signal of a frequency equal to said predetermined transmission frequency.

12. A method of performing from a base station of a wireless communication system detection of interference waves that may interfere with communications carried out between said base station and a mobile station, comprising the steps of:
converting, at said base station, data to be transmitted from said base station into a radio signal of a predetermined transmission frequency, and transmitting, at said base station, said radio signal to a mobile station;
receiving, at said base station, a radio signal lying within a certain reception band of frequencies including a predetermined reception frequency from said mobile station, said predetermined reception frequency being different from said predetermined transmission frequency; and
in order to detect an interference wave signal lying within a certain transmission band of frequencies including said predetermined transmission frequency, stopping the transmission of said radio signal of the predetermined transmission frequency to said mobile station and receiving, at said base station, said interference wave signal.

13. The interference wave detecting method according to claim 12, further comprising the steps of, when said interference wave signal having a frequency equal to said predetermined transmission frequency has been detected, making, at said base station, a request to change said predetermined transmission frequency to another transmission frequency, and, when said interference wave signal lying within said transmission band of frequencies, but having a frequency different from said predetermined transmission frequency has been detected, furnishing, at said base station, a notify signal indicating the detection of the interference wave signal.

14. The interference wave detecting method according to claim 12, wherein in said stopping step, the transmission of said radio signal of said predetermined transmission frequency to said mobile station is stopped only when one or more continuous null time slots of said radio signal are being transmitted to said mobile station.

15. The interference wave detecting method according to claim 14, further comprising the step of enabling said receiving step of receiving said interference wave signal only when one or more continuous null time slots of said radio signal is being transmitted from said base station.

16. The interference wave detecting method according to claim 14, further comprising the step of, in order to detect an interference wave signal lying within said transmission band of frequencies, but having a frequency different from said predetermined transmission frequency of said radio signal being transmitted to said mobile station, changing said predetermined reception frequency to a different frequency so as to detect said interference wave signal having a frequency which is different from said predetermined transmission frequency.

17. The interference wave detecting method according to claim 16, further comprising the steps of providing a plurality of synthesizers, and changing said predetermined reception frequency by switching among said plurality of synthesizers.

18. The interference wave detecting method according to claim 12, further comprising the step of, in order to detect an interference wave signal of a frequency equal to said predetermined reception frequency, recognizing, as said interference wave signal, said radio signal received within a period of time during which one or more continuous null time slots of said radio signal are being received.

19. The interference wave detecting method according to claim 12, further comprising the steps of, in order to detect an interference wave signal lying within a certain reception band of frequencies, but having a frequency different from that of said radio signal being transmitted by said mobile station, changing said predetermined reception frequency to a different frequency within a period of time during which one or more continuous null time slots of said radio signal are being transmitted to said mobile station, and recognizing, as said interference wave signal, said radio signal received within a period of time during which one or more continuous null time slots of said radio signal are being received, after said predetermined reception frequency has been changed.

20. The interference wave detecting method according to claim 12, further comprising the steps of transmitting a radio signal including test data, and, upon receipt of said radio signal, comparing said test data included in said radio signal transmitted in said transmitting step with test data included in said received radio signal.

\* \* \* \* \*